United States Patent [19]
Via

[11] 3,750,422
[45] Aug. 7, 1973

[54] FLEXIBLE TORQUE TRANSMISSION COUPLINGS

[75] Inventor: Carlo Via, Milan, Italy

[73] Assignee: Societa Applicazioni Gomma Antivibranti Saga S.p.A., Milan, Italy

[22] Filed: May 30, 1972

[21] Appl. No.: 257,611

[30] Foreign Application Priority Data
Oct. 28, 1971 Italy .............................. 30461 A/71

[52] U.S. Cl. .................... 64/11 R, 64/13, 64/14
[51] Int. Cl. ............................................. F16d 3/28
[58] Field of Search ..................... 64/13, 12, 11 R, 64/14

[56] References Cited
UNITED STATES PATENTS

| | | |
|---|---|---|
| 2,982,118 | 5/1961 | Franceschetti et al. ................. 64/13 |
| 3,112,626 | 12/1963 | Barone ................................ 64/11 R |
| 3,353,373 | 11/1967 | Schumacher et al. ................ 64/11 R |
| 3,425,240 | 2/1969 | Feller et al. .......................... 64/11 R |
| 3,470,710 | 10/1969 | Feller et al. .......................... 64/11 R |

Primary Examiner—Charles J. Myhre
Assistant Examiner—Randall Heald
Attorney—Richard C. Sughrue et al.

[57] ABSTRACT

This invention relates to resilient couplings of the type comprising a ring assembly of alternate rigid and resilient members clamped between two shaft coupling members adjacent rigid members of the ring assembly being connected to opposite shaft coupling members to provide a flexible torque transmission coupling. The rigid members of the ring assembly have a tooth which projects towards the shaft coupling member to which it is attached and abuts one side of a ridge which extends tangentially with respect to an annular ridge which surrounds the hole through which extends a bolt to clamp the two members together. This abutment prevents the rigid member of the ring assembly from rotating during clamping of the bolt so that the adjacent resilient elements of the ring assembly are not distorted during this clamping.

1 Claim, 4 Drawing Figures

1

FLEXIBLE TORQUE TRANSMISSION COUPLINGS

BACKGROUND OF THE INVENTION

The present invention relates to resilient couplings for the transmission of torque, and particularly to couplings of the type which comprise a resilient element to which two rigid coupling members are attached, the resilient element being in the form of a ring of small resilient elements interconnected by means of rigid link elements each of which has an axial opening through which extends a bolt which connects the resilient ring to one of the rigid coupling members.

In order to prevent rotation of the link elements around their respective bolts during the assembly of the resilient ring to the rigid shaft coupling members so as to avoid the consequent harmful distortions of the flexible ring, it has been proposed, and described in Italian Pat. No. 613,033 that each rigid link element should be provided with an axially projecting rigid tooth in a position which is slightly eccentric with respect to the hole for the teeth; adjacent link elements extending in opposite directions into cooperating recesses formed in the arms of the corresponding shaft coupling member.

Although resilient couplings of this type satisfactorily solve this technical problem, they have one disadvantage in that assembly and disassembly of the coupling requires relative axial movement of the shaft coupling members due to the fact that the recesses into which the teeth on the link elements have to fit, or from which they have to be removed, are located parallel to the axis of the respective coupling member. This axial movement of the coupling members is inconvenient, and in some cases may not be possible.

SUMMARY OF THE INVENTION

According therefore to the present invention, there is provided a resilient torque transmission coupling of the type comprising an annular resilient assembly to which the arms of two rigid shaft coupling members are attached, the annular resilient assembly being formed of a plurality of resilient elements interconnected in a ring by a corresponding number of link elements each of which has an axial opening through which extends a respective bolt which extends into a hole in an arm of one or other of the shaft coupling members and connects the annular resilient assembly thereto, there being provided means for preventing rotation of the link elements during assembly thereof to the shaft coupling members characterised in that the rotation preventing means comprise an axial tooth on each link element and an annular ridge surrounding each hole in the shaft coupling members against each of which abuts the end of a respective link element, each annular ridge having an associated tangential ridge against one side of which the axial tooth in the associated link member abuts, the said one side of the tangential ridge being substantially parallel to a plane parallel to the axis of the shaft coupling member and passing through the centre of the said hole in the shaft coupling member and the centre of the shaft coupling member and being displaced slightly from this plane in the direction of tightening rotation of the thread on the bolt, the annular ridge, the tangential ridge and the length of the said tooth being substantially the same.

Various other features and advantages of the invention will become apparent during the course of the following description with reference to the accompanying drawings which is given purely by way of non-restrictive example.

DESCRIPTION OF THE PREFERRED EMBODIMENT

Figure 1:
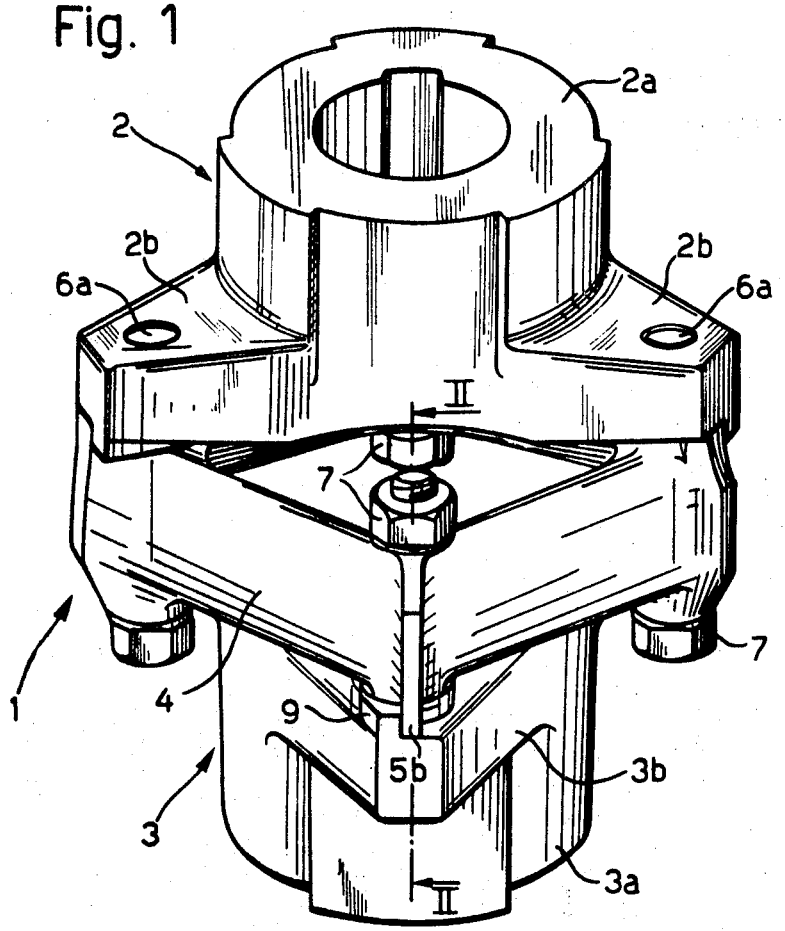
FIG. 1 is a perspective view of a resilient coupling formed as an embodiment of the invention.

The coupling illustrated in the drawings comprises a resilient hexagonal annular assembly 1 to which are attached two shaft coupling members 2, 3, each of which consists of a boss 2a, 3a respectively, and three arms 2b, 3b respectively. The angle between adjacent arms of each shaft coupling member is 120°.

The resilient annular assembly comprises a number of small rubber blocks 4, adjacent blocks being connected to each other by means of rigid link members 5 each of which has an axial hole 5a for a bolt 6 which connects the assembly 1 to one of the shaft coupling members.

Each bolt 6 is screwed at one end 6a into a threaded hole 11 in one of the arms of one of the shaft coupling members, and is threaded at the other end to receive a clamping nut 7. Each link member 5 has a tooth 5b extending axially in an eccentric position with respect to the centre of the hole 5a: the teeth 5b of adjacent link members 5 extend in opposite directions since adjacent link members are attached to opposite shaft coupling members.

Figure 2:
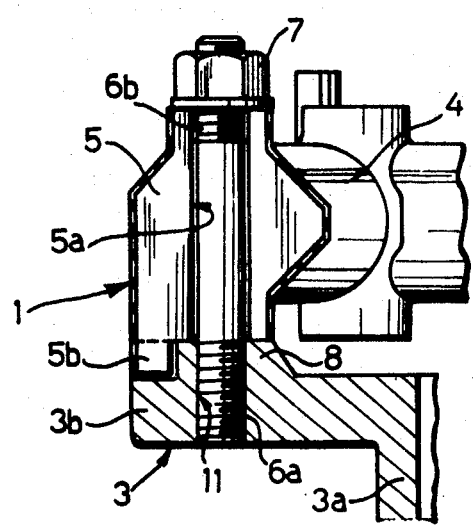
FIG. 2 is a partial section taken on the line II—II of FIG. 1.
Figure 3:
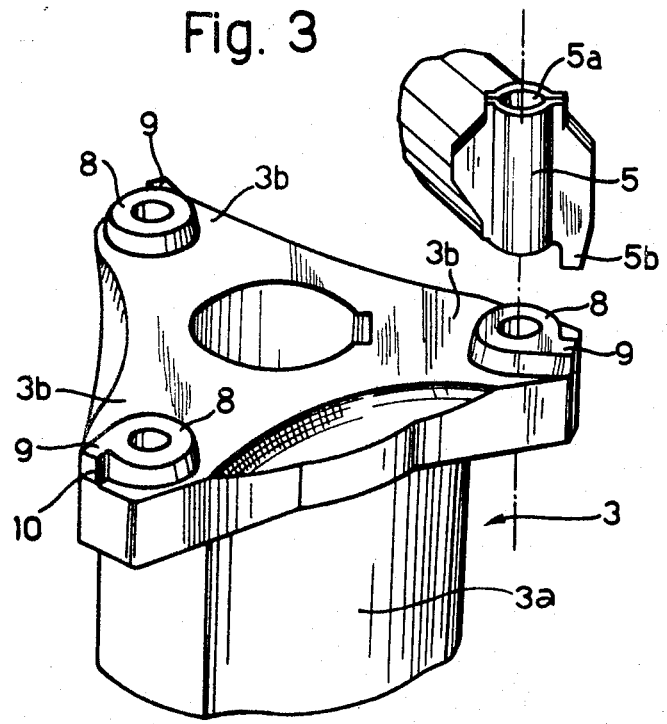
FIG. 3 is a perspective view of one of the shaft coupling members of the resilient coupling shown in FIG. 1.
Figure 4:
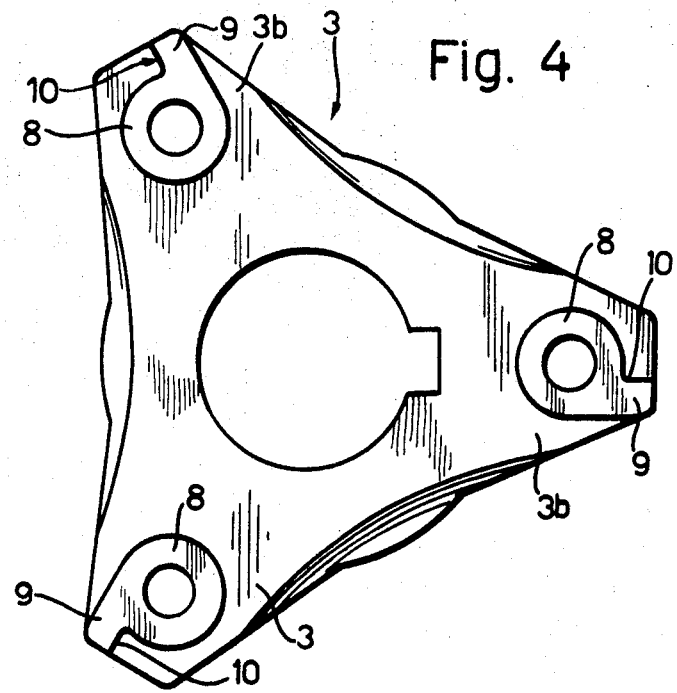
FIG. 4 is an end view of the shaft coupling member shown in FIG. 3.

The means for preventing rotation of the link members 5 during assembly of the resilient ring to the shaft coupling members will be described with particular reference to FIGS. 2 and 4 which show the shaft coupling member 3.

The arms 3b each have, upon the surface which faces the annular resilient assembly, an annular ridge 8 which surrounds and is coaxial with the threaded hole 11. The ridge 8 abuts the corresponding link member 5 when the coupling is assembled and has an associated ridge 9 extending in a tangential direction, thereto. One side 10 of the tangential ridge 9 is positioned parallel to a plane which passes through the axis of the shaft coupling member and through the axis of the hole 11, and is spaced from this plane in the direction of rotation corresponding to tightening of the thread of the nut 7, by a distance roughly equal to the thickness of the tooth 5b and abuts the side of the tooth 5b when the coupling is assembled; the height of the tangential ridge 9 and the length of the tooth 5b are approximately the same.

In the embodiment shown in the drawings the position of the abutting surface 10 of the tangential ridge 9 corresponds to a right hand thread of the nuts 7. It will be seen that as the nuts 7 are being screwed up the abutting surfaces 10 of the ridges 9 prevent the link elements 5 from rotating upon their respective bolts 6. Assembly and disassembly of the coupling described above can be effected without requiring relative axial movement of the shaft coupling members simply by angular movement of one of the shaft coupling members.

Assembly of the flexible coupling is as follows:

Firstly the two shaft coupling members 2, 3, are to be located in their operating positions and then one of the two shaft coupling members is rotated by about 30° so that resilient annular assembly 4 can be fitted between them, the shaft coupling member which was displaced is then rotated in the opposite direction until the teeth 5b are brought into contact with the abutment surfaces 10 of the tangential ridges 9. The nuts 7 are then screwed down onto the bolts 6 to complete the assembly.

Disassembly is effected by means of the same operations in the reverse order.

I claim:

1. In a resilient torque transmission coupling of the type comprising an annular assembly of alternate rigid members and resilient members, said rigid members having holes therethrough, and two rigid shaft coupling members having holes therein, said annular assembly being attached between said shaft coupling members by means of bolts extending through said holes in said rigid members of said annular assembly into said holes in said shaft coupling members, the improvement wherein there is provided an axially extending tooth on each said rigid member of said annular assembly, the tooth on adjacent said rigid members of said annular assembly extending in opposite axial directions, an annular ridge surrounding each said hole in said shaft coupling members, a further ridge tangential to said annular ridge, said further ridge having one face substantially parallel to an axial plane passing through the centre of said hole in said shaft coupling member and through the centre of said shaft coupling member but displaced therefrom in the direction of tightening rotation of the thread on said bolts whereby said teeth on said rigid members of said annular assembly, and said one faces of said tangential ridges on said shaft coupling members abut to prevent rotation of said rigid member of said annular assembly during tightening of said bolts, the height of said annular and tangential ridges being substantially equal to the axial length of said teeth.

* * * * *